United States Patent [19]

Narita et al.

[11] Patent Number: 5,465,039
[45] Date of Patent: Nov. 7, 1995

[54] POWER SUPPLY FOR ELECTRONIC DEVICE, AND ELECTRONIC DEVICE SYSTEM

[75] Inventors: Izuru Narita, Sagamihara; Keiji Suzuki, Fujisawa; Toshitsugu Mito, Atsugi; Noboru Tsurukawa, Yamato, all of Japan

[73] Assignee: International Business Machines Corporation, Armonk, N.Y.

[21] Appl. No.: 118,899

[22] Filed: Sep. 9, 1993

[30] Foreign Application Priority Data

Sep. 16, 1992 [JP] Japan .................................. 4-246338

[51] Int. Cl.⁶ .................................................. H02J 7/00
[52] U.S. Cl. .................... 320/32; 320/28; 320/39
[58] Field of Search .................... 320/22, 31, 32

[56] References Cited

U.S. PATENT DOCUMENTS 4,404,472  9/1983  Steigerwald .............................. 307/46
5,025,202  6/1991  Ishii et al. ................................. 320/32
5,191,277  3/1993  Ishikura et al. .......................... 320/22
5,325,040  6/1994  Bogut et al. .............................. 320/22
5,355,073  10/1994  Nguyen ..................................... 320/15
5,371,456  12/1994  Brainard .................................. 320/31

*Primary Examiner*—Steven L. Stephan
*Assistant Examiner*—Nicholas Ponomarenko
*Attorney, Agent, or Firm*—Martin J. McKinley; Andrew J. Dillon

[57] ABSTRACT

To make it possible to supply to a battery a charging current having a sufficient capacity which enables a short-time charge while supplying a drive current for usual operation to a battery operable electronic device, without making construction large-sized and complicated.

The present invention is intended to be able to delicately vary a charging current of a battery according to the variation of power consumption of load on an electronic device, by providing constant power feedback control means for performing feedback control of the outputted power so as to cause a constant power or a nearly constant power, based on a current feedback value and a voltage feedback value.

10 Claims, 7 Drawing Sheets

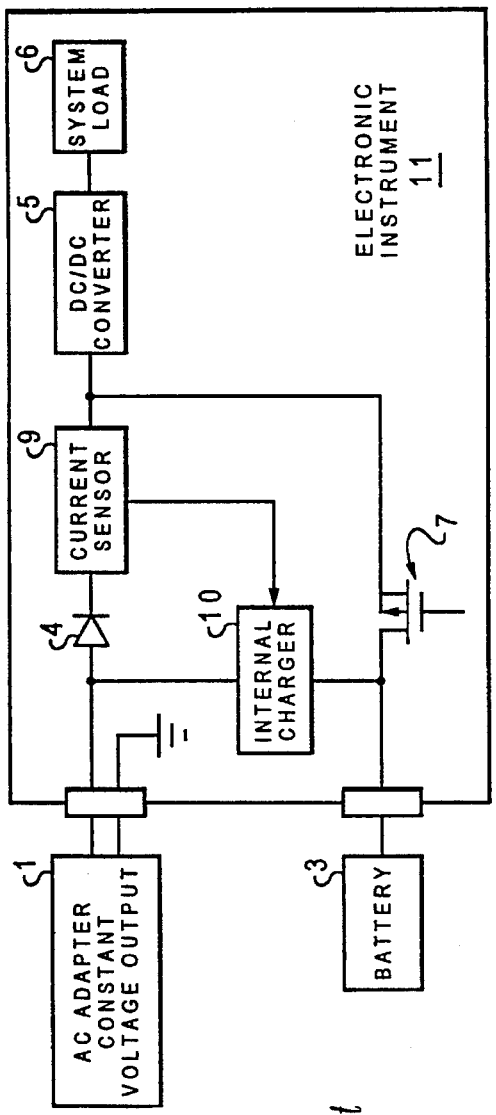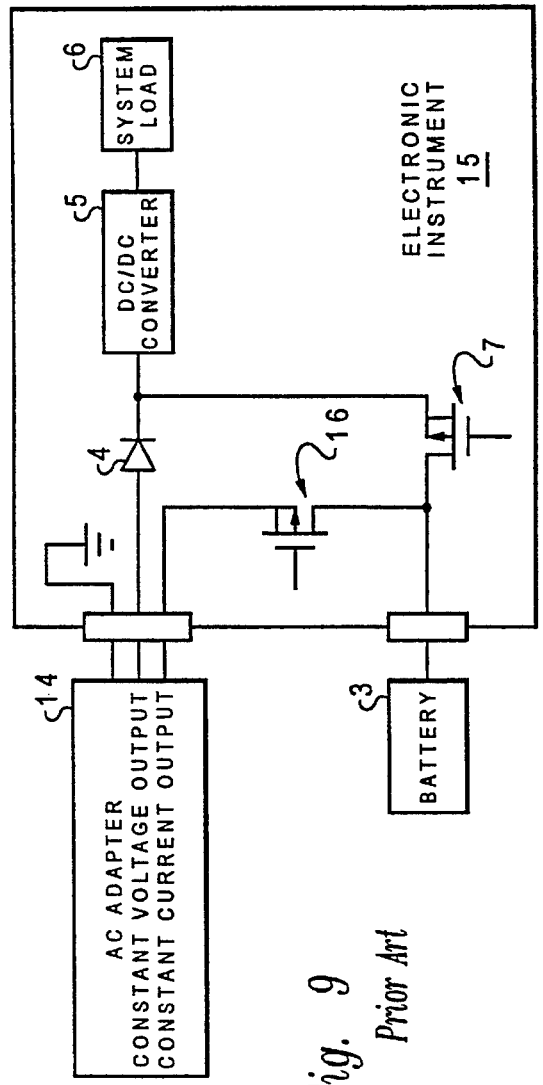
Fig. 8
Prior Art
Fig. 9
Prior Art

POWER SUPPLY FOR ELECTRONIC DEVICE, AND ELECTRONIC DEVICE SYSTEM

BACKGROUND OF THE INVENTION

1. Field of the Invention

The present invention relates to a power supply apparatus such as an AC adapter, and more particularly to a power supply apparatus which not only supplies a drive current to a battery operable electronic apparatus such as a personal computer but also operates as a charger for supplying a charging current to a driving battery.

2. Description of Related Art

FIG. 7 shows an example of conventional construction. In the figure, an AC adapter 1 converts an AC input to DC and outputs it. Voltage feedback control is performed in the inside of the AC adapter 1 and constant voltage output is produced from the AC adapter 1. Connected to a battery operable electronic instrument 2 such as a personal computer is a battery 3. The electronic instrument 2 includes a diode 4, a DC voltage converter 5, and a system load 6, and the constant voltage output of the AC adapter 1 is converted to DC voltage suitable for the operation of the system Load 6 by the DC voltage converter 5 and then is provided to the system load 6. If the electronic instrument 2 is operated by a battery, the output of the battery 3 is provided to the DC voltage converter 5 through an FET switch 7.

Further, the electronic instrument 2 includes an internal charger 8 to which the constant voltage output of the AC adapter 1 is also provided. The internal charger 8, which is a power supply apparatus for outputting a constant current, supplies a charging current to the battery 3. If the output of the AC adapter 1 is supplied direct to the battery 3 without using the internal charger 8, there is a risk that excessive current flows into the battery 3 since the output of the AC adapter 1 is not a constant current. Therefore, such construction cannot be adopted.

In the conventional construction of FIG. 7, the AC adapter 1 can supply a charging current to the battery 3 through the internal charger 8 while it supplies a drive current to the system Load 6. That is, the battery 3 can be charged while the electronic instrument 2 is working. However, when importance is attached to the portability of the battery operable electronic instrument 2, it is difficult to make the internal charger 8 of a large capacity output, that is, a large size in respect of mounting it. Therefore, the value of the outputted current (charging current) of the internal charger 8 cannot but become small, and it was impossible to charge in a short time. Further, regardless of the current value of the constant voltage output of the AC adapter 1, the current value of the output (charging current) of the internal charger 8 is fixed. Therefore, even if the power consumption of the system load 6 is small, the value of the charging current is invariable, and the charging time cannot be accordingly shortened simply because the power consumption of the system load 6 is small.

FIG. 8 shows another example of conventional construction. In the example, a current sensor 9 is provided for detecting the current value of the constant voltage output of the AC adapter 1. Further, the constant current output value of an internal charger 10 varies according to a detected value by the current sensor 9. For example, when an electronic instrument 11 normally operates and the current value of the constant voltage output of the AC adapter 1 is within the range from 0.15 to 1.7 amperes, the internal charger 10 charges the battery 3 by the constant current of 0.60 amperes, and when the current value of the constant voltage output of the AC adapter 1 is within the range from 0 to 0.15 amperes, the internal charger 10 charges the battery 3 by the constant current of 1.85 amperes.

Also in such conventional construction of FIG. 8, in a current value within each range described above, the current value of the output (charging current) of the internal charger 10 is fixed regardless of the current value of the constant voltage output of the AC adapter 1. Therefore, simply because the power consumption of the system load 6 is small while the electronic instrument 11 normally operates, the surplus power of the AC adapter 1 cannot be utilized as a charging current and the charging time cannot be accordingly shortened. Further, in the conventional construction of FIG. 7 and FIG. 8, since the AC adapter 1 itself outputs only a current of a constant voltage, the internal chargers 8 and 10 should be provided inside the electronic instrument 2 so as to charge the battery 3, but it is disadvantageous to provide the internal chargers 8 and 10 in enhancing the portability of the electronic instruments 2 and 11.

FIG. 9 shows still another example of conventional construction. In the figure, an AC adapter 14 has construction in which a constant voltage output apparatus and a constant current output apparatus are combined and has an output line for a constant voltage and an output line for a constant current separately. An internal charger is not provided to an electronic instrument 15, and the constant current output line of the AC adapter 14 is connected to the battery 3 through a switch 16. The constant voltage output line is connected to the DC voltage converter 5. In the conventional construction of FIG. 9, by providing a constant current output function having a sufficient capacity to the AC adapter 14, the battery 3 can be charged in a short time while the electronic instrument 15 operates. However, since power of two systems is provided to the AC adapter 14, construction becomes complicated and large-sized. Further, since three power connecting lines become necessary between the AC adapter 14 and the electronic instrument 15, also in this respect, construction becomes complicated and large-sized.

PROBLEMS TO BE SOLVED BY THE INVENTION

An object of the present invention is to provide such a power supply apparatus as can supply to a battery a charging current having such a sufficient capacity as enables a short-time charge while supplying a drive current necessary for usual operation to a battery operable electronic device, and an electronic apparatus system including such a power supply apparatus, without making system including such a power supply apparatus, without making construction large-sized and complicated.

MEANS FOR SOLVING PROBLEMS

To attain said object, the present invention is intended to be able to delicately vary a charging current of a battery according to the variation of power consumption of load on an electronic device, by providing constant power feedback control means for performing feedback control of an outputted power so as to cause a constant power or a nearly constant power, based on a voltage feedback value and a current feedback value.

BRIEF DESCRIPTION OF THE DRAWING(S)

FIG. 8 is a block diagram showing the circuit configuration of another example of a conventional power supply apparatus.

FIG. 9 is a block diagram showing the circuit configuration of another example of a conventional power supply apparatus.

Figure 1:
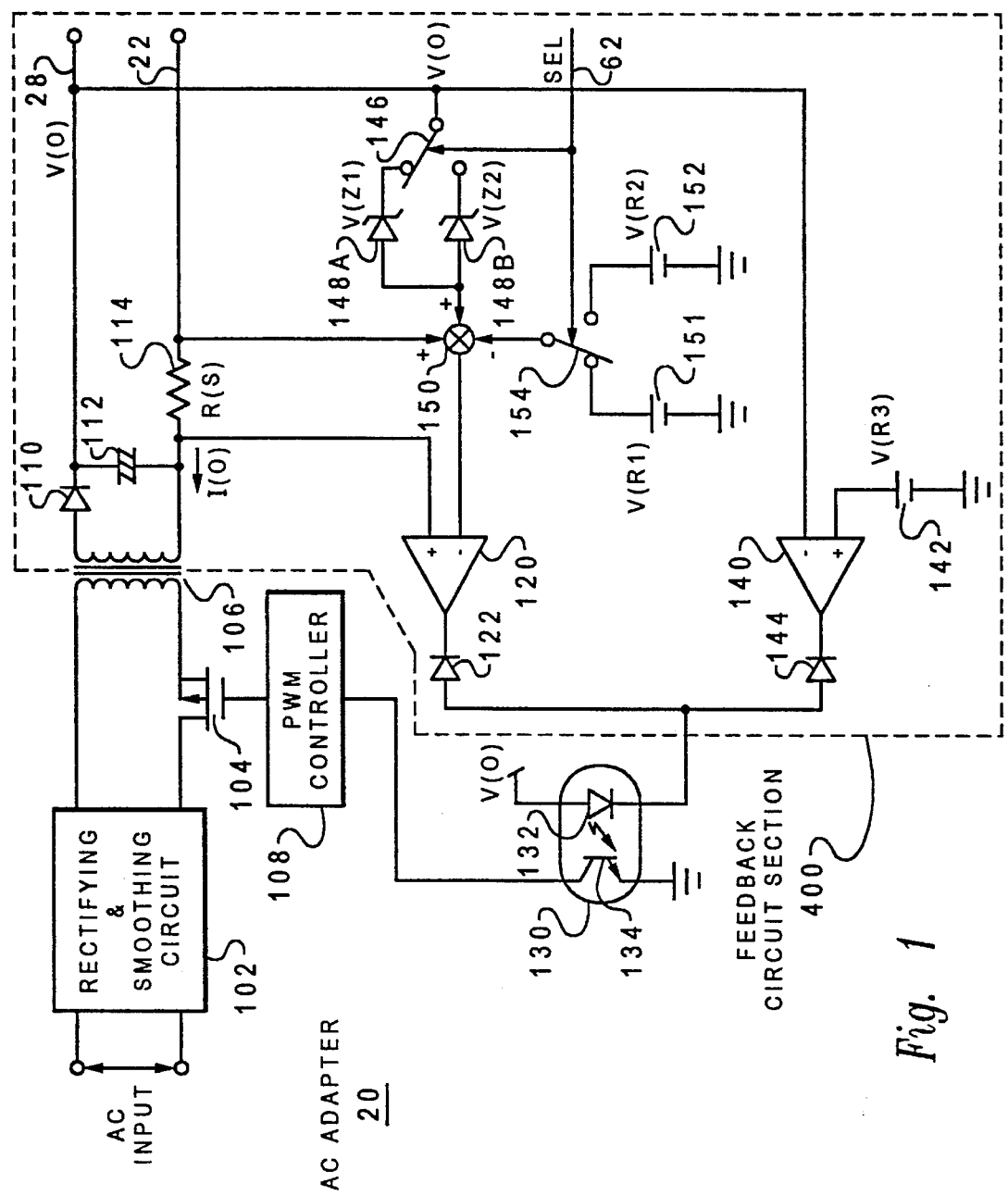
FIG. 1 is a block diagram showing the circuit configuration of an embodiment of a power supply apparatus according to the present invention.

20 . . . AC adapter
30 . . . Electronic apparatus
34 . . . DC voltage converter
36 . . . System load
40 . . . Battery
60 . . . Power management processor
114 . . . Current detection resistance
120 . . . First differential amplifier
140 . . . Second differential amplifier
142 . . . Reference voltage generating circuit
146 . . . Control mode change-over switch
148 . . . Constant voltage generating circuit (Zener diode)
150 . . . Adder-subtracter
200 . . . AC adapter
250 . . . Multiplier
400 . . . Feedback circuit section

DESCRIPTION OF THE ILLUSTRATIVE EMBODIMENT(S)

Figure 2:
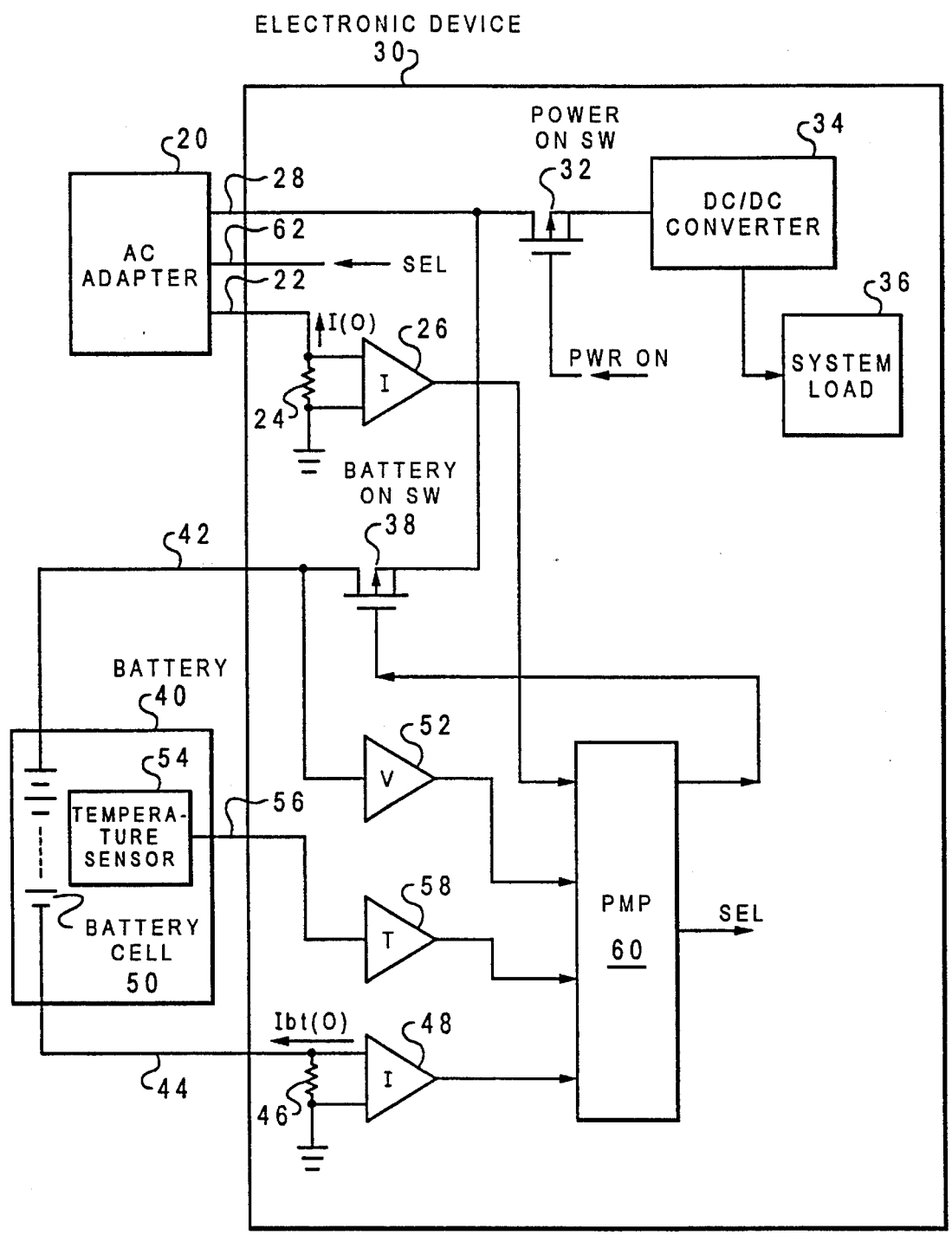
FIG. 2 is a block diagram showing the overall construction of an electronic apparatus including said power supply apparatus according to the present invention.

FIG. 2 shows an embodiment of an electronic device system according to the present invention. In the figure, an AC adapter 20 as a power supply apparatus is detachably connected, through two power lines 22 and 28 and a control signal line 62, to an electronic apparatus 30. The electronic device 30 is, for example, a battery operable personal computer. However, what the present invention is applied to is not limited to a battery operable personal computer. Further, a battery 40 is detachably connected to the electronic device 30 through two power lines 42 and 44 and a detection signal line 56.

One power line 22 of the AC adapter 20 is grounded through a current detecting resistance 24. The electric potentials of both ends of the current detecting resistance 24 are inputted to a differential amplifier 26 for detecting current, and a voltage other power line 28 is connected through a power-on switch 32 to a DC voltage converter 34, the output line of which is connected to a system load 36. The power-on switch 32 is turned on or off according to a control signal indicated by "PWR ON" in the figure. The control signal is generated by operating a system-on switch (not shown) of the electronic device 30. Further, the power line 28 is also connected, through a battery-on switch 38, to one power line 42 of the battery 40.

The other power line 44 of the battery 40 is grounded through a current detecting resistance 46. The electric potentials of both ends of the current detecting resistance 46 are inputted to a differential amplifier 48 for detecting current, and a voltage signal corresponding to the output current value Ibt(O) of the battery 40 is outputted from the differential amplifier 48. Further, connected to the power line 42 is a voltage detecting amplifier 52, from which a voltage signal indicating the terminal voltage of the battery 40 is outputted. Provided inside the battery 40 is a temperature sensor 54 as well as a battery cell 50. The output signal of the temperature sensor 54 is inputted, through the temperature detection signal line 56 of the battery 40, to a temperature detecting amplifier 58.

The output signals of the battery current detecting amplifier 48, the battery voltage detecting amplifier 52, and the battery temperature detecting amplifier 58 are provided to a power management processor 60. The power management processor 60 is, for example, a one-chip computer provided with an analog-to-digital converter. The output signal of the AC power output current detecting amplifier 26 are also provided to the power management processor 60. Further, the power management processor 60 outputs a control signal for turning on or off the battery-on switch 38. Still further, the power management processor 60 outputs a control mode switching signal indicated by "SEL" in the figure, and the signal is provided to the AC adapter 20 through the control signal line 62 of the AC adapter 20.

The power management processor 60 obtains information about battery temperature from the output signal of the battery temperature detecting amplifier 58 and prevents a charging current from flowing into the battery 40 by turning off the battery-on switch 38 if it is determined that the battery temperature risen by a charge became higher than a predetermined value. Further, the power management processor 60 obtains information about battery voltage from the output signal of the battery voltage detecting amplifier 52 and prevents a charging current from flowing into the battery 40 by turning off the battery-on switch 38 if it is determined that the battery voltage was outside a predetermined range. Still further, the power management processor 60 obtains information about battery current from the output signal of the battery current detecting amplifier 48 and calculates the remaining capacity of a battery based on the information.

FIG. 1 shows the internal construction of the AC adapter 20. In the figure, a rectifying and smoothing circuit 102 rectifies and smoothes AC input. On the output side of the rectifying and smoothing circuit 102, and AC generating switch 104 and the primary coil of a transformer 106 are connected in series. A value of voltage applied to the primary coil of the transformer 106 is controlled according to the on/off time of the switch 104. The on/off time of the switch 104 is controlled by a pulse width modulator (PWM) 108.

Connected to the secondary coil of the transformer 106 through a smoothing circuit comprising a diode 110 and a capacitor 112 are the power lines 22 and 28. Now, it is assumed that an electric potential of the power line 28 is a power electric potential or an output electric potential V(O). The output electric potential V(O) is a voltage feedback value (voltage feedback signal). Provided, in series, to the power line 22 is a current detection resistance 114. Now, it is assumed that a resistance value of the resistance 114 is R(S) and a value of the current which flows through the resistance 114, that is, the output current of the AC adapter 20 is I(O). The output current I(O) is converted to a voltage signal I(O) R(S) by the current detection resistance 114 and I(O) R(S) becomes a current feedback signal. One of the electric potentials of both ends of the current detection resistance 114 is inputted to a non-reverse input terminal of a first differential amplifier 120 and the other is inputted to an adder-subtracter 150.

Added to the output electric potential V(O) is either a constant voltage −V(Z1) generated by a first Zener diode 148A or a constant voltage −V(Z2) generated by a second Zener diode 148B. A value after addition is added to said other electric potential of the resistance 114 in the adder-subtracter 150. Further, in the adder-subtracter 150, either a reference voltage V(R1) generated by a first reference voltage generating circuit 151 or a reference voltage V(R2) generated by a second reference voltage generating circuit 152 is subtracted. The output of the adder-subtracter 150 is inputted to a reverse input terminal of the first differential amplifier 120.

Whether a constant voltage −V(Z1) generated by the Zener diode 148A is inputted to the adder-subtracter 150 or a constant voltage −V(Z2) generated by the Zener diode 148B is inputted to the adder-subtracter 150 is determined by operating a switch 146. Further, whether a reference voltage V(R1) generated by the reference voltage generating circuit 151 is inputted to the adder-subtracter 150 or a reference voltage V(R2) generated by the reference voltage generating circuit 152 is inputted to the adder-subtracter 150 is determined by operating a switch 154. The power management processor 60 (FIG. 2) outputs the signal "SEL" for operating the switches 146 and 154.

The output signal of the differential amplifier 120 are inputted, through a counterflow checking diode 122, to one terminal of a light-emitting element 132 of a photocoupler 130. The other terminal of the light-emitting element 132 is connected to a power voltage V(O). One terminal of a photo sensitive element 134 of the photocoupler 130 is grounded, and the other terminal is connected to the PWM controller 108. Here, the current detection resistance 114, the Zener diodes 148A and 148B, the adder-subtracter 150, the first differential amplifier 120, the photocoupler 130, the PWM controller 108, the switch 104, the transformer 106, the diode 110, and the capacitor 112 compose constant power feedback control means.

If the output electric potential V(O) is lower than a constant voltage V(Z1) generated by the Zener diode 148A or a constant voltage V(Z2) generated by the Zener diode 148B, current does not flow through the Zener diode 148A or 148B. Therefore, inputted to the adder-subtracter 150 is not a voltage feedback signal V(O), but only a current feedback signal I(O) R(S), and the output of the AC adapter 20 becomes a constant current output. That is, in such case, said constant power feedback control means functions as constant current feedback control means.

The power line 28 is connected to a reverse input terminal of a second differential amplifier 140. Connected to a non-reverse input terminal of the second differential amplifier 140 is a reference voltage generating circuit 142 for generating a reference voltage V(R3), the electric potential V(O) of the power line 28 is compared with a reference electric potential V(R3). The output of the second differential amplifier 140 is connected, through a counterflow checking diode 144, to the output of the counterflow checking diode 122 and then connected to the photocoupler 130. Here, the second differential amplifier 140, the photocoupler 130, the PWM controller 108, the switch 104, the transformer 106, the diode 110, and the capacitor 112 compose constant voltage feedback control means. In the state where the constant voltage feedback control means operates, the output of the AC adapter 20 becomes a constant voltage output.

The outputs of the first and second differential amplifiers 120 and 140 are connected to each other and then inputted to the photocoupler 130. If the load impedance of the AC adapter 20 is high, in other words, if the output current value I(O) is smaller than a predetermined value, the output (sink current) of the first differential amplifier 120 substantially vanishes, said constant power feedback means through the first differential amplifier 120 does not function, the voltage feedback control means through the second differential amplifier 140 functions, and the output of the AC adapter 20 becomes a constant voltage output.

When the load impedance of the AC adapter 20 becomes low and the output current value I(O) increases and reaches a predetermined value, the output (sink current) of the first differential amplifier 120 begins to increase and current feedback comes to work. When the load impedance of the AC adapter 20 becomes still lower, the output voltage V(O) begins to lower, the output (sink current) of the second differential amplifier 140 substantially vanishes, and both current feedback and voltage feedback by the first differential amplifier 120 come to work. Consequently, the output of the AC adapter 20 becomes a nearly constant power output.

The output of the AC adapter 20 becomes a nearly constant power state when the battery-on switch 38 (FIG. 2) is turned on. Then, the power line 42 of the battery 40 is connected to the output line 28 of the AC adapter 20, the battery 40 is charged, and the output voltage of the AC adapter 20 comes to depend upon the voltage of the power line 42 of the battery 40.

If the output electric potential V(O) of the AC adapter 20 is lower than the electric potential V(Z1) of the Zener diode 148A or the electric potential V(Z2) of the Zener diode 148B, a voltage feedback value of a feedback path through the Zener diode 148A or the Zener diode 148B becomes zero. Therefore, a feedback path through the first differential amplifier 120 turns out to work as current feedback control means. That is, current feedback means formed by the current detection resistance 114, the first differential amplifier 120, the photocoupler 130, and the PWM controller 108 works and the output of the AC adapter 20 is controlled so as to become a constant current.

Constant current control so performed that it obtains a desired current value depends on whether the reference voltage V(R1) of the first reference voltage generating circuit 151 was selected or the reference voltage V(R2) of the second reference voltage generating circuit 152 was selected. The selection of the reference voltage V(R1) and the reference voltage V(R2) depends on the "SEL" signal generated by the power management processor 60 (FIG. 2).

Described in the following is the case where the output electric potential V(O) of the AC adapter 20 is higher than the electric potential V(Z1) of the Zener diode 148A or the electric potential V(Z2) of the Zener diode 148B. In this case, a voltage feedback value of a feedback path through the Zener diode 148A or the Zener diode 148B does not become zero, and both the voltage feedback value and a current feedback value from the current detection resistance 114 are added by the adder-subtracter 150. Therefore, a feedback path through the first differential amplifier 120 works as nearly constant power control feedback means, and the output of the AC adapter 20 is controlled so as to become a nearly constant power, based on both the current feedback value and the voltage feedback value.

When detecting that the power-on switch 32 is turned on and the system Load 36 is in a usual operating condition (a condition that is not a power-saving mode), the power management processor 60 makes the "SEL" signal active and turns the change-over switch 154 to the first reference voltage generating circuit 151 while it turns the change-over switch 146 to the first Zener diode 148A. In this case, the following expression is established with respect to a feedback path which returns to the first differential amplifier 120 through the photocoupler 130 and the PWM controller 108 from the first differential amplifier 120:

$$(V(R1)-I(O) R(S)-V(O)+V(Z1)) A=V(O)$$

where, A is all gains of the first differential amplifier 120, the photocoupler 130, the PWM controller 108, and the transformer 106. The gain is the gain of the entire current feedback path except the current detection resistance 114 and is infinite to the quantity of variation of controlled variables I(O). The above expression can be transformed as follows:

$$(V(R1) - I(O) R(S) + V(Z1)) A = V(O) + A\, V(O) \quad \text{(Equality 1)}$$

$$V(R1) - I(O) R(S) + V(R1) \ = V(O) (1 + A)/A$$
$$= V(O) (1/A + 1)$$
$$= V(O)$$

$$V(O) = -I(O) R(S) + V(R1) + V(Z1)$$

Then, nearly constant power control is performed in the AC adapter 20.

From Equality 1, the following expression is obtained with respect to an output current I(O):

$$I(O)=(-V(O)+V(Z1)+V(R1))/R(S)$$

In the above expression, since current does not flow through the Zener diode 148A when an output voltage V(O) is smaller than V(Z1), the voltage feedback quantity which passes through the switch 146 and the Zener diode 148A becomes zero, the terms V(O) and V(Z1) of the above expression vanish, and the following expression is obtained:

$$I(O)=V(R1)/R(S) \quad \text{(Equality 2)}$$

In Equality 2, since the right side is a constant, constant current control is performed in the AC adapter 20.

When detecting that the power-on switch 32 is turned off or the system load 36 is working in a power-saving mode though the power-on switch 32 is turned on, the power management processor 60 makes the "SEL" signal inactive and turns the change-over switch 154 to the second reference voltage generating circuit 152 while it turns the control mode change-over switch 146 to the second Zener diode 148B. In this case, the following expression is established with respect to a feedback path which returns to the first differential amplifier 120 through the photocoupler 130 and the PWM controller 108 from the first differential amplifier 120:

$$(V(R2)-(I(O) R(S)-V(O)+V(Z2)) A=V(O)$$

The above expression can be transformed as follows:

$$(V(R2) - I(O) R(S) + V(Z2)) A = V(O) + A\, V(O)$$

$$V(R2) - I(O) R(S) + V(Z2)) \ = V(O) (1 + A)/A$$
$$= V(O) (1/A + 1)$$

Now, since A is infinite as described above, the expression can be written as follows:

$$(V(R2) - I(O) R(S) + V(Z2)) = V(O) \quad \text{(Equality 3)}$$

$$V(O) = -I(O) R(S) + V(R2) + V(Z2)$$

Then, nearly constant power control is performed in the AC adapter 20.

From Equality 3, the following expression is obtained with respect to a current I(O):

$$I(O)=(-V(O)+R2)+V(Z2))/R(S)$$

In the above expression, since current does not flow through the second Zener diode 148B when an output electric potential V(O) is lower than the electric potential (V(Z2) of the Zener diode 148B, the voltage feedback quantity which passes through the switch 146 and the Zener diode 148B from V(O) becomes zero, the terms V(O) and V(Z2) of the above expression vanish, and the following expression is obtained:

$$I(O)=V(R2)/R(S) \quad \text{(Equality 4)}$$

Now, since the right side of Equality 4, V(R2)/R(S), is a constant, constant current control is performed in the AC adapter 20.

Independently of whether the control mode change-over switch 146 is turned to the first Zener diode 148A or the second Zener diode 148B, the following expression is established with respect to a feedback path which returns to the second differential amplifier 140 through the photocoupler 130 and the PWM controller 108 from the second differential amplifier 140; where, B is gain obtained by multiplying all of the gains of the second differential amplifier 140, the photocoupler 130, the PWM controller 108, and the transformer 106 is infinite to the quantity of variation of controlled variables V(O):

$$(V(R3) - V(O)) B = V(O) \quad \text{(Equality 5)}$$

$$V(O) (1 + B) = B\, V(R3)$$

$$V(O) = V(R3) B/(1 + B)$$

$$V(O) = V(R3)$$

Now, since the right side of Equality 5, V(R3), is a constant, constant voltage control is performed in the AC adapter 20.

Figure 3:
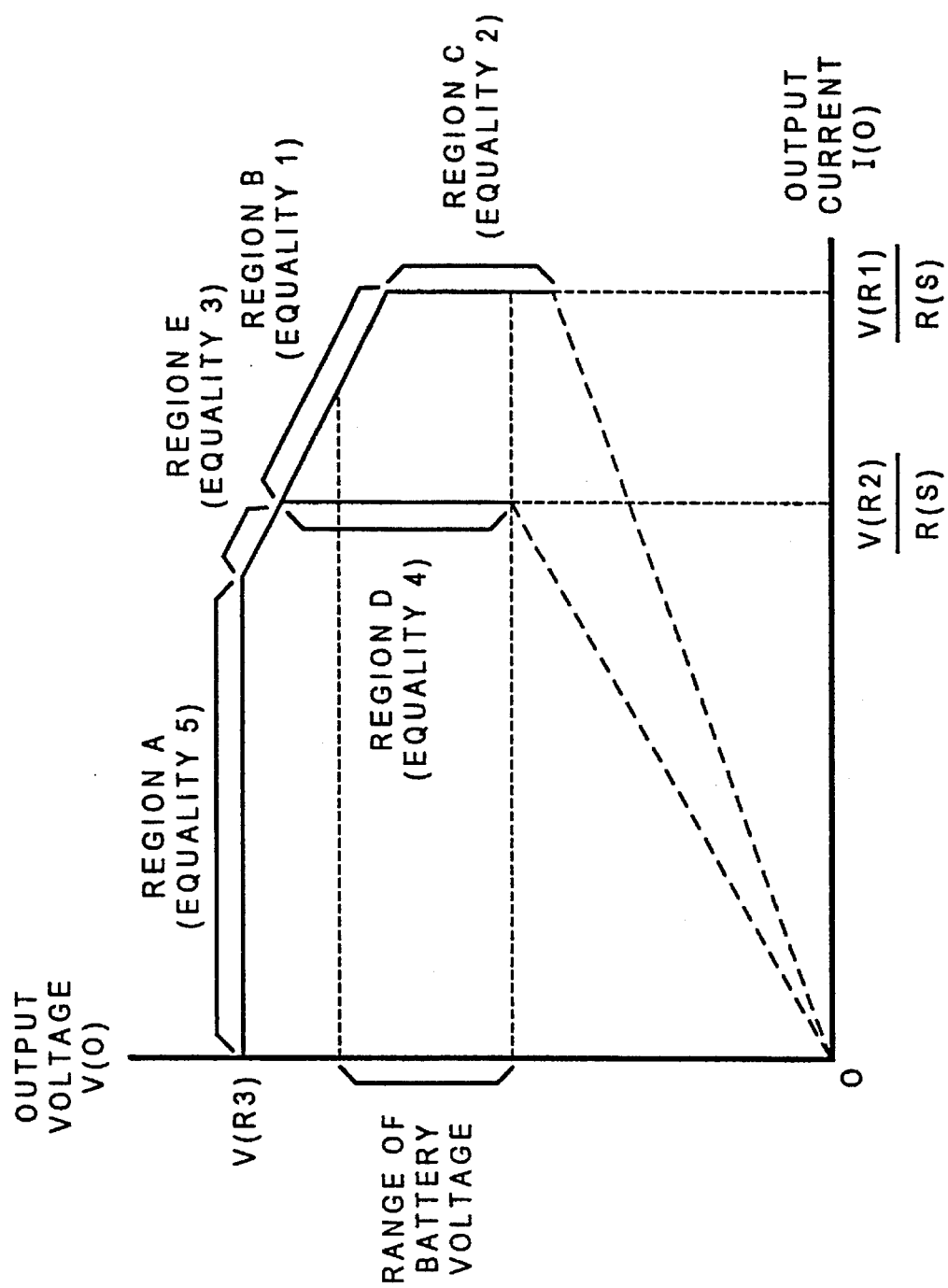
FIG. 3 is a graph showing the relationship between an output voltage and an output current of the embodiment of FIG. 1.

FIG. 3 shows the output characteristics of the AC adapter 20. The ordinate shows a value of an output voltage V(O) and the abscissa shows a value of an output current I(O). In the figure, Region A is a region in which Equality 5 is established and constant voltage control is being performed. Then, the power-on switch 32 is turned on and the battery-on switch 38 is turned off. The AC adapter 20 comes to provide constant voltage output to the system load 36.

Region B is a region in which Equality 1 is established and nearly constant power control is being performed. Then, the control mode changeover switch 146 is turned to the first Zener diode 148A. Further, the power-on switch 32 is turned on and the battery-on switch 38 is turned on as well. The AC adapter 20 comes to supply an excess power as a charging current to the battery 40 while it supplies a drive current to the system load 36. Output in Region B makes it possible to be charged in a short time while a system is operating.

Region C is a region in which Equality 2 is established and constant current control is being performed so that a current value may become a value determined by V(R1)/R(S). Then as well, the output of the AC adapter 20 supplies a charging current to the battery 40 while it supplies a drive current to the system load 36. Region C is provided to control a value of the charging current so that the changing current does not cause damage to the battery 40.

Region D is a region in which Equality 4 is established and constant current control is being performed so that a current value may become a value determined by V(R2)/R(S). Then, the control mode change-over switch 146 is turned to the second Zener diode 148B. Further, the power-on switch 32 is turned off or the system load 36 is working in a power-saving mode even though the power-on switch 32 is turned on, and the battery-on switch 38 is turned on. The AC adapter 20 supplies a constant current determined by V(R2)/R(S) to the battery 40 and comes to work as a quick charger.

Region E is a region in which Equality 3 is established and nearly constant power control is performed. The region only restricts a maximum power which can be outputted by the AC adapter 20 and is not utilized for driving the system load 36 and for charging the battery 40.

According to such an embodiment as described above, it is possible to realize any of a constant voltage output mode (Region A), a nearly constant power output mode (Regions B and E), and a constant current output mode (Regions C and D) by merely providing newly-devised means to the control path of the AC adapter 20. Therefore, compared with the case where power supply apparatus each having the output modes are simply combined, the embodiment does not make the entire apparatus large-sized and complicated.

Further, since output is generated in the constant voltage output mode (Region A) if a system load is usually operated without charging a battery, in the nearly constant power output mode (Region B) and the constant current output mode (Region C) if the battery is charged while a system is operating, and in the constant current output mode (Region D) if the battery is charged without usually operating a system load, it is always possible to effectively utilize the power supply capability of the AC adapter 20.

Still further, since nearly constant power control (Region B) is performed, circuit configuration becomes simpler as compared with the case where accurate constant power control is performed. That is, in order to perform accurate constant power control, a multiplier is needed for multiplying a current feedback signal by a voltage feedback signal. In the embodiment, a multiplier is not needed since nearly constant power control is realized by the adder 150. In terms of circuit configuration, an adder is simpler than a multiplier.

Figure 4:
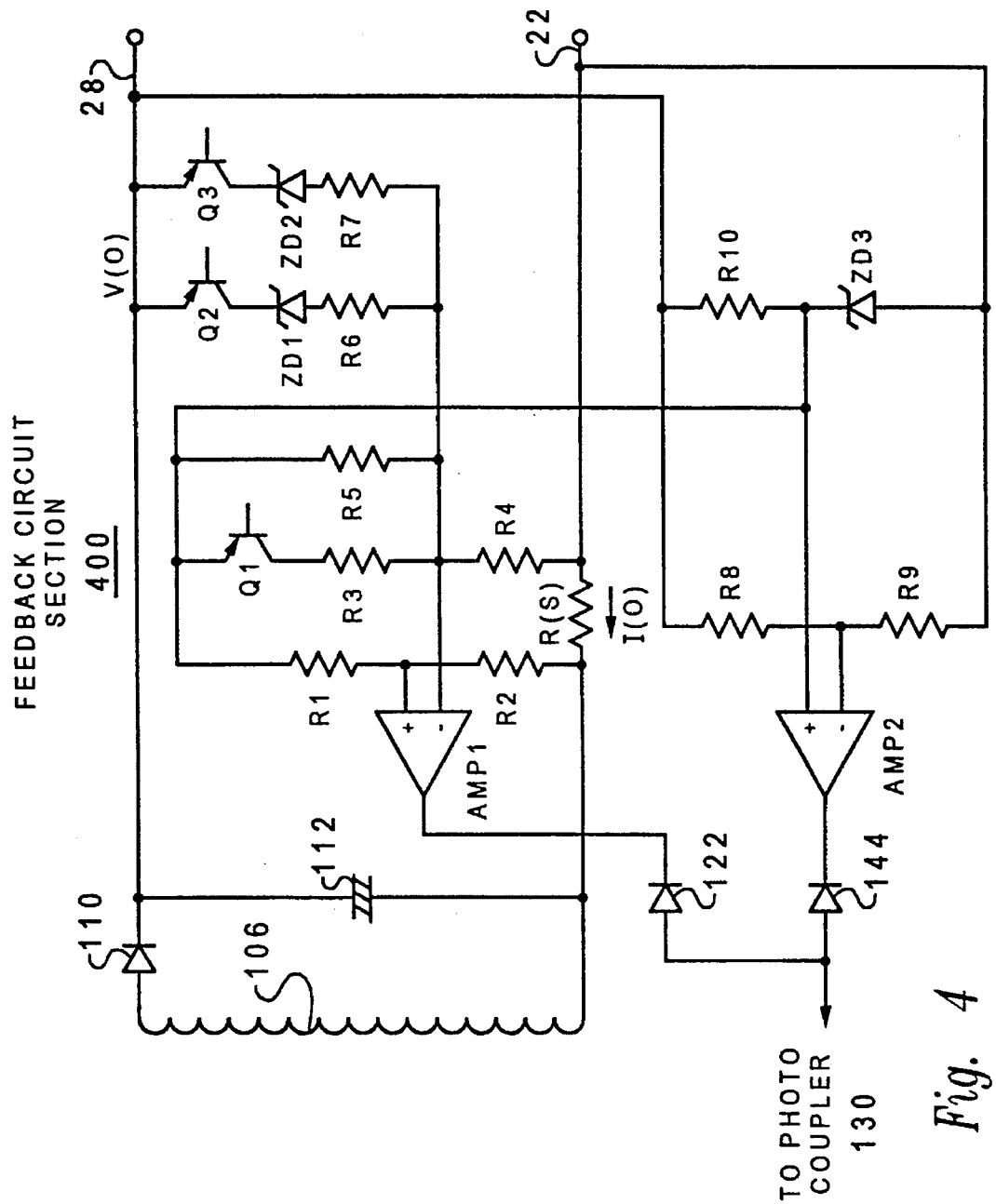
FIG. 4 is a block diagram showing an example of a concrete circuit which composes a feedback circuit section of the embodiment of FIG. 1.

FIG. 4 shows an example of a concrete circuit which composes a feedback circuit section 400 of FIG. 1. AMP1 of FIG. 4 corresponds to the differential amplifier 120 of FIG. 1, and AMP2 of FIG. 4 corresponds to the differential amplifier 140 of FIG. 1. Resistances R3, R4, R5, R6, and R7 of FIG. 4 compose the adder-subtracter 150 of FIG. 1. A transistor Q1 of FIG. 4 corresponds to the switch 154 of FIG. 1. Vref generated by the resistance R3 and a reference voltage generating circuit ZD3 of FIG. 4 corresponds to voltage generated by the reference voltage generating circuit 151 of FIG. 1, and Vref generated by the resistance R5 and the reference voltage generating circuit ZD3 of FIG. 4 corresponds to voltage generated by the reference voltage generating circuit 152 of FIG. 1. ZD1 and ZD2 of FIG. 4 correspond to the Zener diodes 148A and 148B of FIG. 1, respectively. Transistors Q2 and Q3 of FIG. 4 compose the switch 146 of FIG. 1. Further, the object of the reference voltage generating circuit 142 on the side of the differential amplifier 140 of FIG. 1 is attained by reference voltage Vref generated by the reference voltage generating circuit ZD3 of FIG. 4. Resistances R8 and R9 of FIG. 4 form the voltage feedback path from V(O).

Figure 5:
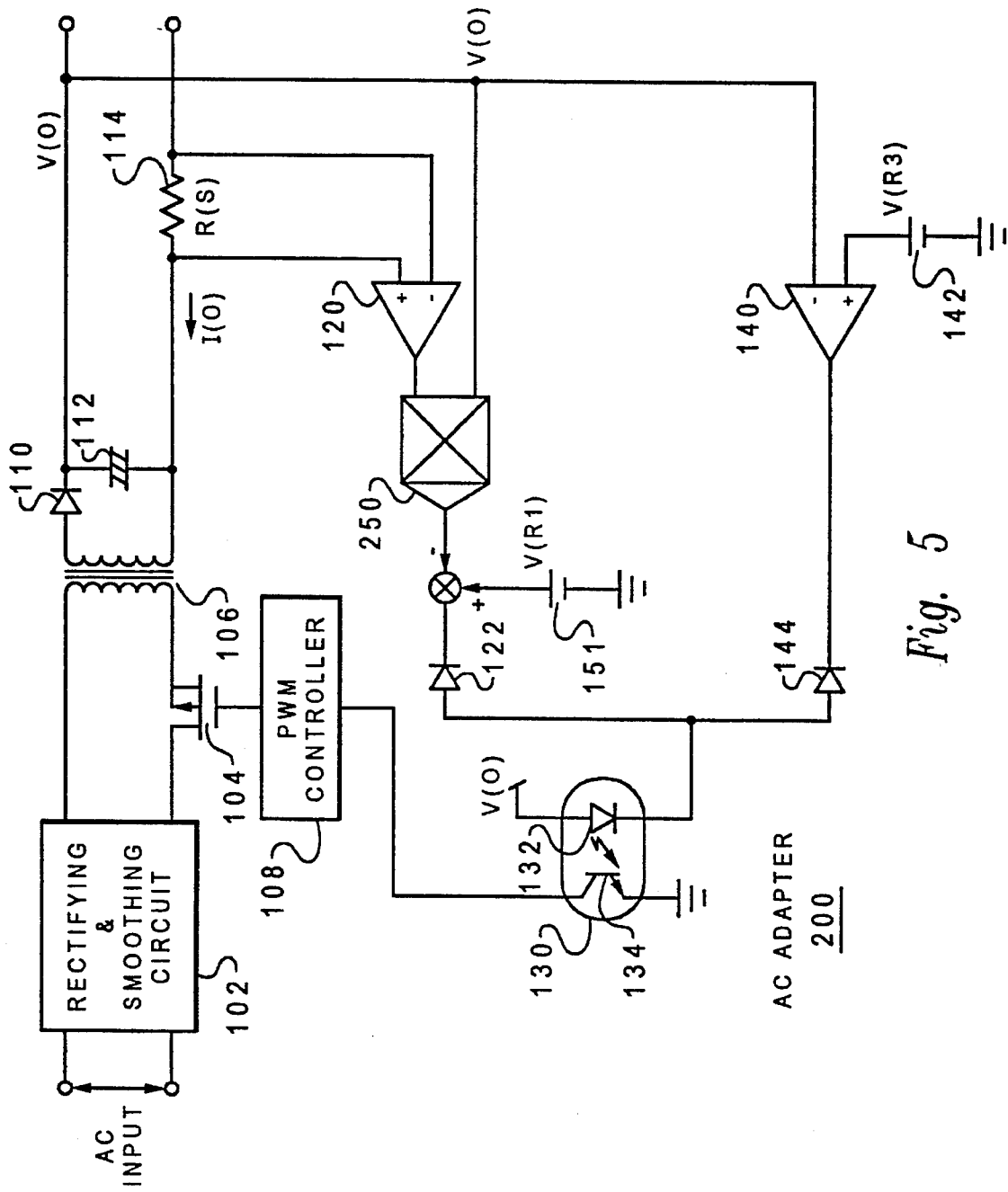
FIG. 5 is a block diagram showing the circuit configuration of an embodiment other than said embodiment.

Though an embodiment other than said embodiment is described in the following, the description of the part which is the same as or similar to said embodiment is simplified or omitted using the same symbol as in said embodiment. An AC adapter 200 of FIG. 5 includes a multiplier 250, which multiplies the output of the first differential amplifier 120 by the voltage feedback quantity from V(O). Further, its output is subtracted from V(R4) by a subtracter. With respect to a feedback path which returns to the first differential amplifier 120 through the first differential amplifier 120, the multiplier 250, the photocoupler 130, and the PWM controller 108 the following is established.

$$(V(R4)-(R(S) I(O) C) V(O)) D=V(O)$$

where, C is the gain of the differential amplifier 120, and D is the gain of the entire feedback path including the photocoupler 130 and the PWM controller 108 and is infinite.

$$V(R4) - I(O) V(O) R(S) C = V(O)/D = 0 \quad \text{(Equality 6)}$$

$$V(O) I(O) = V(R4) (1/R(S)) (1/C)$$

Figure 6:
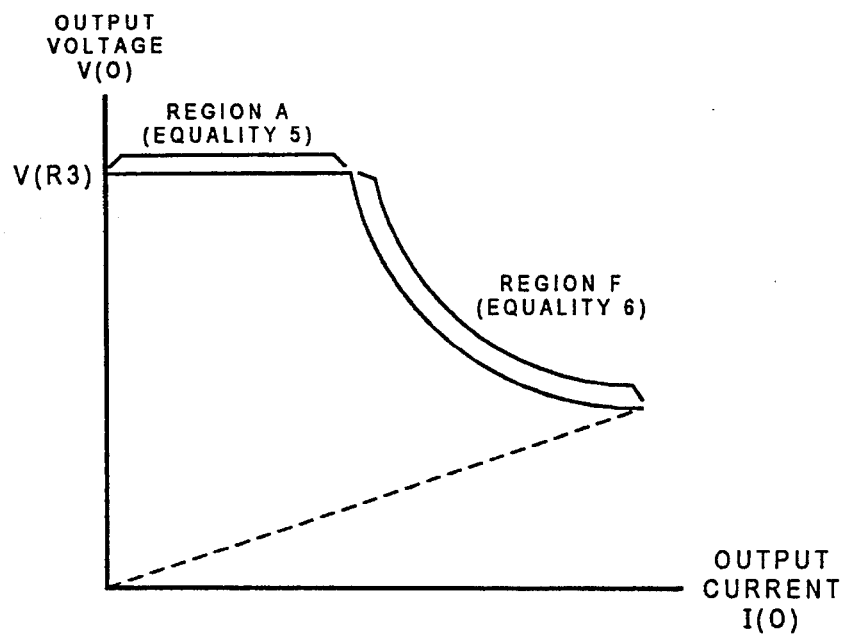
FIG. 6 is a graph showing the relationship between an output voltage and an output current of the embodiment of FIG. 5.
Figure 7:
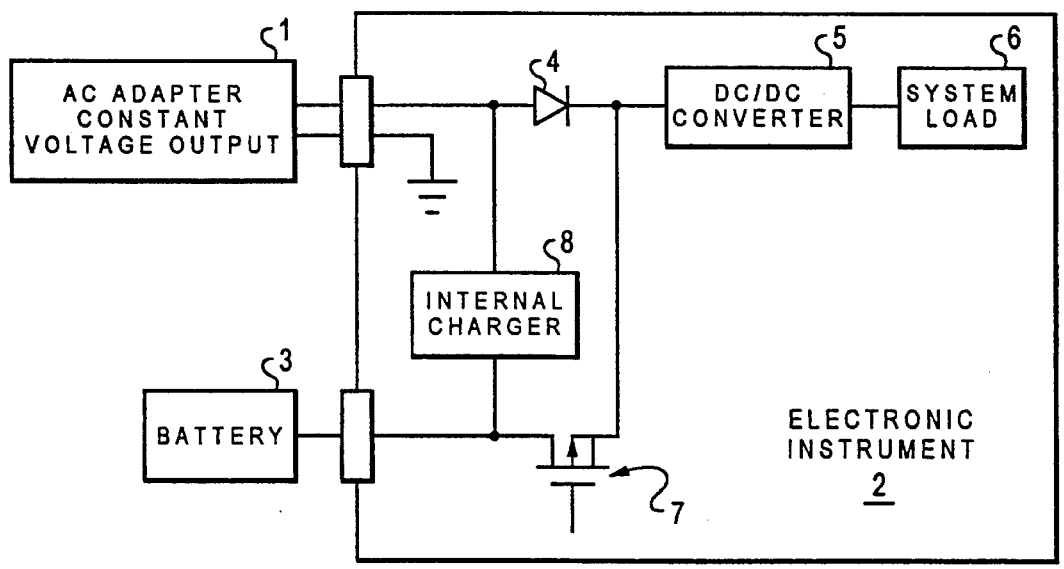
FIG. 7 is a block diagram showing the circuit configuration of an example of a conventional power supply apparatus.

FIG. 6 shows the output characteristics of the AC adapter 200. The ordinate shows a value of an output voltage V(O) and the abscissa shows a value of an output current I(O). In the figure, Region A is a region in which Equality 4 is established and constant voltage control is being performed, which is the same as in the AC adapter 20 of FIG. 1. Region F is a region in which Equality 6 is established and constant power control is being performed. Then, the AC adapter 200 comes to supply an excess power as a charging current to a battery while it supplies a drive current to a system load.

According to such an embodiment as described above, by performing accurate constant power control, a battery is charged while a system is operating. Therefore, an excess power can be utilized for charging the battery still more effectively than the case where nearly constant power control is performed and the battery is charged while the system is operating. Further, in the embodiment of FIG. 5, unlike the embodiment of FIG. 1, a control mode change-over switch is not provided. However, it will be appreciated that a mode change-over switch may be provided and a constant current output mode (Regions C and D) may be provided in the same way as the embodiment of FIG. 1.

ADVANTAGES OF THE INVENTION

According to the present invention, it is possible to provide an electronic apparatus system including such a power supply apparatus that can supply to a battery a charging current having such a sufficient capacity as enables a short-time charge while supplying a drive current for usual operation to a battery operable electronic apparatus, without making construction large-sized and complicated.

What is claimed is:

1. A power supply apparatus for an electronic device which is powered by either a drive current or a battery, said power supply apparatus comprising means for supplying said drive current for driving the electronic device and a charging current for charging said battery, said power supply apparatus having constant power feedback control means for performing feedback control of an outputted power based on a current feedback value and a voltage feedback value, such that the outputted power is substantially constant.

2. The power supply apparatus for an electronic device according to claim 1, wherein said constant power feedback control means performs substantially constant power feedback control based on a value obtained by adding said current feedback value and said voltage feedback value.

3. The power supply apparatus for an electronic device according to claim 2, wherein said constant power feedback control means disregards said voltage feedback value and performs constant current feedback control based on said current feedback value if the voltage feedback value is smaller than a predetermined value.

4. The power supply apparatus for an electronic device according to claim 3, wherein said predetermined value can be selected from a plurality of predetermined values.

5. The power supply apparatus for an electronic device according to claim 1, wherein said constant power feedback control means performs constant power feedback control based on a value obtained by multiplying said current feedback value by said voltage feedback value.

6. A power supply apparatus for an electronic device which is powered by either a drive current or a battery, said power supply apparatus comprising means for supplying a drive current for driving the electronic device and a charging current for charging said battery, the power supply apparatus having constant power feedback control means for performing feedback control of an outputted power based on a current feedback value and a voltage feedback value such that the outputted power is substantially constant and constant voltage feedback control means for performing feedback control of the outputted power based on a voltage feedback value so as to cause a constant voltage, said power supply apparatus being constructed such that the voltage feedback control means is operative if a Load impedance is higher than a first predetermined value and such that the power feedback control means is operative if the Load impedance is less than a second predetermined value.

7. The power supply apparatus for an electronic device according to claim 6, wherein said constant power feedback control means disregards said voltage feedback value and performs constant current feedback control based on said current feedback value if the voltage feedback value is smaller than a third predetermined value.

8. An electronic apparatus system comprising a battery operable electronic device, a battery for supplying a drive current to said electronic device, and a power supply apparatus for supplying a charging current to said battery during supplying a drive current to said electronic device, wherein said power supply apparatus has constant power feedback control means for performing feedback control of an outputted power based on a current feedback value and a voltage feedback value such that the outputted power is substantially constant.

9. An electronic apparatus system comprising a battery operable electronic device, a battery for supplying a drive current to said electronic device, and a power supply apparatus for supplying a charging current to said battery during supplying a drive current to said electronic device, wherein said power supply apparatus has constant power feedback control means for performing feedback control of an outputted power such that the outputted power is substantially constant, said constant power feedback control means including a current feedback control means for performing feedback control of the outputted power based on a current feedback value and a voltage feedback value such that the outputted power is substantially constant and constant voltage feedback control means for performing feedback control of the outputted power so as to cause a constant voltage based on a voltage feedback value, said voltage feedback control means being operative if a load impedance is higher than a first predetermined value and said power feedback control means being operative if the Load impedance is less than a second predetermined value.

10. An electronic apparatus system comprising a battery operable electronic device, a battery for supplying a drive current to said electronic device, and a power supply apparatus for supplying a charging current to said battery during supplying a drive current to said electronic device, wherein said power supply apparatus has a first differential amplifier for amplifying a difference between a current feedback value and a reference current value, a second differential amplifier for amplifying a difference between a voltage feedback value and a reference voltage value, and a feedback path which is operative such that a difference between a reverse input and a non-reverse input of the first and second differential amplifiers is minimized, and is constructed such that the feedback by the second differential amplifier is operative when an output current value is less than a first predetermined value and such that the feedback by the first differential amplifier is operative when the output current value reaches a second predetermined value, and a voltage feedback value is added to a current feedback value inputted to said first differential amplifier when said electronic device is operating.

* * * * *